(12) United States Patent
Freeman

(10) Patent No.: US 12,476,963 B1
(45) Date of Patent: Nov. 18, 2025

(54) SYSTEMS AND METHODS OF PRESERVING SECURITY AUTHENTICATION FOR MULTI-THREADED DATA PROCESSING

(71) Applicant: Cloudburst Intellectual Holding Company, LLC, Chino Valley, AZ (US)

(72) Inventor: Norman W. Freeman, Chino Valley, AZ (US)

(73) Assignee: Cloudburst Intellectual Holding Company, LLC, Charleston, SC (US)

( * ) Notice: Subject to any disclaimer, the term of this patent is extended or adjusted under 35 U.S.C. 154(b) by 0 days.

(21) Appl. No.: 19/075,418

(22) Filed: Mar. 10, 2025

(51) Int. Cl.
*G06F 21/00* (2013.01)
*H04L 9/40* (2022.01)

(52) U.S. Cl.
CPC ........ *H04L 63/0846* (2013.01); *H04L 63/108* (2013.01)

(58) Field of Classification Search
CPC .................. H04L 63/0846; H04L 63/108
See application file for complete search history.

(56) References Cited

U.S. PATENT DOCUMENTS

| | | | |
|---|---|---|---|
| 2013/0086652 A1* | 4/2013 | Kavantzas | G06F 21/335 709/204 |
| 2016/0149881 A1* | 5/2016 | Rengan | H04L 63/107 726/7 |
| 2018/0219969 A1* | 8/2018 | Filev | G10L 15/1822 |
| 2021/0306344 A1* | 9/2021 | Han | H04L 63/08 |

* cited by examiner

*Primary Examiner* — Kendall Dolly
(74) *Attorney, Agent, or Firm* — Bryan L. Baysinger; Thomas R. Parker, II; Maynard Nexsen PC

(57) ABSTRACT

Various methods, systems, and computer program products for providing authentication across multiple processes. An example method includes causing a transmission of a first request for authentication. The example method also includes receiving a first set of authentication credentials valid for a first time period. The first set of authentication is distributed to a first set of processes to access data in the first dataset during the first time period. The example method further includes causing a transmission of a second request for authentication. The second request for authentication is transmitted within the first time period in which the first set of authentication credentials is valid. The example method still further includes receiving a second set of authentication credentials valid for a second time period. The second set of authentication credentials is distributed to the first set of processes to access data in the first dataset during the second time period.

17 Claims, 6 Drawing Sheets

SYSTEMS AND METHODS OF PRESERVING SECURITY AUTHENTICATION FOR MULTI-THREADED DATA PROCESSING

FIELD

An example embodiment relates generally to data security associated with data processing, and more particularly, to preserving security authentication for multi-threaded data processing.

BACKGROUND

Precipitating large databases are often time and resource consuming. However, the data stored in the large databases also have security measures that protect the data, but limits the ability to improve precipitation speed. As such, there exists a need for a system that can provide data precipitation on disparate segments of computing infrastructure.

SUMMARY

The following paragraphs present a summary of various embodiments of the present disclosure and are merely examples of potential embodiments. As such, the summary is not meant to limit the subject matter or variations of various embodiments discussed herein.

In some aspects, the techniques described herein relate to a method for providing authentication across multiple processes, the method including causing a transmission of a first request for authentication for a first authentication server, wherein the first request for authentication is associated with a first dataset; receiving a first set of authentication credentials associated with the first dataset in response to the first request for authentication, wherein the first set of authentication credentials is valid for a first time period; causing a transmission of the first set of authentication credentials to a first set of processes, wherein the first set of processes comprises at least two processes, wherein each of the first set of processes use the first set of authentication credentials to access data in the first dataset to process during the first time period; causing a transmission of a second request for authentication for the first authentication server, wherein the second request for authentication is associated with the first dataset, wherein the second request for authentication is transmitted within the first time period in which the first set of authentication credentials is valid; receiving a second set of authentication credentials associated with the first dataset in response to the second request for authentication, wherein the second set of authentication credentials is valid for a second time period; and causing a transmission of the second set of authentication credentials to the first set of processes, wherein each of the first set of processes use the second set of authentication credentials to access data in the first dataset to process during the second time period.

In some aspects, the techniques described herein relate to a method, further including receiving the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

In some aspects, the techniques described herein relate to a method, wherein the first dataset is inaccessible without the active set of authentication credentials.

In some aspects, the techniques described herein relate to a method, wherein the first set of authentication credentials is deactivated at an expiration of the first time period.

In some aspects, the techniques described herein relate to a method, wherein the second set of authentication credentials is distributed to the first set of processes before the expiration of the first time period.

In some aspects, the techniques described herein relate to a method, further including receiving an indication that a first process of the first set of processes has completed access to the first dataset within the first time period, wherein the first process is removed from the first set of processes before transmission of the second set of authentication credentials.

In some aspects, the techniques described herein relate to a method, wherein each of first set of processes performs precipitation processing on a subset of the first dataset, wherein each of the first set of processes is assigned a distinct subset of the first dataset to process. In some aspects, the techniques described herein relate to a method, wherein the precipitation processing is a same processing operation across each of the first set of processes.

In some aspects, the techniques described herein relate to a method, wherein each of the first set of processes process the subset of the first dataset in parallel.

In some aspects, the techniques described herein relate to a method, wherein each of the first set of processes receive access to the first dataset via the first set of authentication credentials during the first time period and via the second set of authentication credentials during the second time period.

In some aspects, the techniques described herein relate to a method, wherein each of the first set of processes correspond to a distinct processing thread of a processing device.

In some aspects, the techniques described herein relate to a method, wherein the first time period and the second time period overlap for at least a portion of time.

In some aspects, the techniques described herein relate to a method, wherein the second time period begins at an expiration of the first time period.

In some aspects, the techniques described herein relate to a method, wherein the second request for authentication for the first authentication server is transmitted at a predetermined amount of time before an expiration of the first time period.

In some aspects, the techniques described herein relate to a method, wherein each of the first set of processes are conducted via at least one first client device.

In some aspects, the techniques described herein relate to a method, wherein the first set of authentication credentials and the second set of authentication credentials provide access to the first dataset via open authorization.

In some aspects, the techniques described herein relate to a method, wherein each of the first set of authentication credentials and the second set of authentication credentials comprise access tokens associated with the first dataset.

In some aspects, the techniques described herein relate to a method, further including causing a transmission of a third request for authentication for a second authentication server, wherein the third request for authentication is associated with the first dataset; receiving a third set of authentication credentials associated with the first dataset in response to the third request for authentication, wherein the third set of authentication credentials is valid for a third time period; causing a transmission of the third set of authentication credentials to a second set of processes, wherein the second set of processes comprises at least two processes, wherein each of the second set of processes use the third set of authentication credentials to access data in the first dataset to process during the third time period; causing a transmission of a fourth request for authentication for the second authentication server, wherein the fourth request for authentication is associated with the first dataset, wherein the fourth request for authentication is transmitted within the third time period in which the first set of authentication credentials is valid; receiving a fourth set of authentication credentials associated with the first dataset in response to the fourth request for authentication, wherein the fourth set of authentication credentials is valid for a fourth time period; and causing a transmission of the fourth set of authentication credentials to the second set of processes, wherein each of the second set of processes use the fourth set of authentication credentials to access data in the first dataset to process during the fourth time period.

In some aspects, the techniques described herein relate to a method, wherein the first time period and the third time period overlap.

In some aspects, the techniques described herein relate to a method, wherein the second time period and the fourth time period overlap.

In some aspects, the techniques described herein relate to a system for providing authentication across multiple processes, the system including at least one non-transitory storage device and at least one processing device coupled to the at least one non-transitory storage device, wherein the at least one processing device is configured to cause a transmission of a first request for authentication for a first authentication server, wherein the first request for authentication is associated with a first dataset; receive a first set of authentication credentials associated with the first dataset in response to the first request for authentication, wherein the first set of authentication credentials is valid for a first time period; cause a transmission of the first set of authentication credentials to a first set of processes, wherein the first set of processes comprises at least two processes, wherein each of the first set of processes use the first set of authentication credentials to access data in the first dataset to process during the first time period; cause a transmission of a second request for authentication for the first authentication server, wherein the second request for authentication is associated with the first dataset, wherein the second request for authentication is transmitted within the first time period in which the first set of authentication credentials is valid; receive a second set of authentication credentials associated with the first dataset in response to the second request for authentication, wherein the second set of authentication credentials is valid for a second time period; and cause a transmission of the second set of authentication credentials to the first set of processes, wherein each of the first set of processes use the second set of authentication credentials to access data in the first dataset to process during the second time period.

In some aspects, the techniques described herein relate to a system, wherein the at least one processing device is further configured to receive the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

In some aspects, the techniques described herein relate to a system, wherein the first dataset is inaccessible without the active set of authentication credentials.

In some aspects, the techniques described herein relate to a system, wherein the first set of authentication credentials is deactivated at an expiration of the first time period.

In some aspects, the techniques described herein relate to a system, wherein the second set of authentication credentials is distributed to the first set of processes before the expiration of the first time period.

In some aspects, the techniques described herein relate to a system, wherein the at least one processing device is further configured to receive an indication that a first process of the first set of processes has completed access to the first dataset within the first time period, wherein the first process is removed from the first set of processes before transmission of the second set of authentication credentials.

In some aspects, the techniques described herein relate to a system, wherein each of first set of processes performs precipitation processing on a subset of the first dataset, wherein each of the first set of processes is assigned a distinct subset of the first dataset to process.

In some aspects, the techniques described herein relate to a system, wherein the precipitation processing is a same processing operation across each of the first set of processes.

In some aspects, the techniques described herein relate to a system, wherein each of the first set of processes process the subset of the first dataset in parallel.

In some aspects, the techniques described herein relate to a system, wherein each of the first set of processes receive access to the first dataset via the first set of authentication credentials during the first time period and via the second set of authentication credentials during the second time period.

In some aspects, the techniques described herein relate to a system, wherein each of the first set of processes correspond to a distinct processing thread of a processing device.

In some aspects, the techniques described herein relate to a system, wherein the first time period and the second time period overlap for at least a portion of time.

In some aspects, the techniques described herein relate to a system, wherein the second time period begins at an expiration of the first time period.

In some aspects, the techniques described herein relate to a system, wherein the second request for authentication for the first authentication server is transmitted at a predetermined amount of time before an expiration of the first time period.

In some aspects, the techniques described herein relate to a system, wherein each of the first set of processes are conducted via at least one first client device.

In some aspects, the techniques described herein relate to a system, wherein the first set of authentication credentials and the second set of authentication credentials provide access to the first dataset via open authorization.

In some aspects, the techniques described herein relate to a system, wherein each of the first set of authentication credentials and the second set of authentication credentials comprise access tokens associated with the first dataset.

In some aspects, the techniques described herein relate to a system, wherein the at least one processing device is further configured to cause a transmission of a third request for authentication for a second authentication server, wherein the third request for authentication is associated with the first dataset; receive a third set of authentication credentials associated with the first dataset in response to the third request for authentication, wherein the third set of authentication credentials is valid for a third time period; cause a transmission of the third set of authentication credentials to a second set of processes, wherein the second set of processes comprises at least two processes, wherein each of the second set of processes use the third set of authentication credentials to access data in the first dataset to process during the third time period; cause a transmission of a fourth request for authentication for the second authentication server, wherein the fourth request for authentication is associated with the first dataset, wherein the fourth request for authentication is transmitted within the third time period in which the first set of authentication credentials is valid; receive a fourth set of authentication credentials associated with the first dataset in response to the fourth request for authentication, wherein the fourth set of authentication credentials is valid for a fourth time period; and cause a transmission of the fourth set of authentication credentials to the second set of processes, wherein each of the second set of processes use the fourth set of authentication credentials to access data in the first dataset to process during the fourth time period.

In some aspects, the techniques described herein relate to a system, wherein the first time period and the third time period overlap.

In some aspects, the techniques described herein relate to a system, wherein the second time period and the fourth time period overlap.

In some aspects, the techniques described herein relate to a computer program product for providing authentication across multiple processes, the computer program product including at least one non-transitory computer-readable medium having one or more computer-readable program code portions embodied therein, the one or more computer-readable program code portions comprising at least one executable portion configured to cause a transmission of a first request for authentication for a first authentication server, wherein the first request for authentication is associated with a first dataset; receive a first set of authentication credentials associated with the first dataset in response to the first request for authentication, wherein the first set of authentication credentials is valid for a first time period; cause a transmission of the first set of authentication credentials to a first set of processes, wherein the first set of processes comprises at least two processes, wherein each of the first set of processes use the first set of authentication credentials to access data in the first dataset to process during the first time period; cause a transmission of a second request for authentication for the first authentication server, wherein the second request for authentication is associated with the first dataset, wherein the second request for authentication is transmitted within the first time period in which the first set of authentication credentials is valid; receive a second set of authentication credentials associated with the first dataset in response to the second request for authentication, wherein the second set of authentication credentials is valid for a second time period; and cause a transmission of the second set of authentication credentials to the first set of processes, wherein each of the first set of processes use the second set of authentication credentials to access data in the first dataset to process during the second time period.

In some aspects, the techniques described herein relate to a computer program product, wherein the one or more computer-readable program code portions include at least one executable portion further configured to receive the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

In some aspects, the techniques described herein relate to a computer program product, wherein the first dataset is inaccessible without the active set of authentication credentials.

In some aspects, the techniques described herein relate to a computer program product, wherein the first set of authentication credentials is deactivated at an expiration of the first time period.

In some aspects, the techniques described herein relate to a computer program product, wherein the second set of authentication credentials is distributed to the first set of processes before the expiration of the first time period.

In some aspects, the techniques described herein relate to a computer program product, wherein the one or more computer-readable program code portions comprise at least one executable portion further configured to receive an indication that a first process of the first set of processes has completed access to the first dataset within the first time period, wherein the first process is removed from the first set of processes before transmission of the second set of authentication credentials.

In some aspects, the techniques described herein relate to a computer program product, wherein each of first set of processes performs precipitation processing on a subset of the first dataset, wherein each of the first set of processes is assigned a distinct subset of the first dataset to process.

In some aspects, the techniques described herein relate to a computer program product, wherein the precipitation processing is a same processing operation across each of the first set of processes.

In some aspects, the techniques described herein relate to a computer program product, wherein each of the first set of processes process the subset of the first dataset in parallel.

In some aspects, the techniques described herein relate to a computer program product, wherein each of the first set of processes receive access to the first dataset via the first set of authentication credentials during the first time period and via the second set of authentication credentials during the second time period.

In some aspects, the techniques described herein relate to a computer program product, wherein each of the first set of processes correspond to a distinct processing thread of a processing device.

In some aspects, the techniques described herein relate to a computer program product, wherein the first time period and the second time period overlap for at least a portion of time.

In some aspects, the techniques described herein relate to a computer program product, wherein the second time period begins at an expiration of the first time period.

In some aspects, the techniques described herein relate to a computer program product, wherein the second request for authentication for the first authentication server is transmitted at a predetermined amount of time before an expiration of the first time period.

In some aspects, the techniques described herein relate to a computer program product, wherein each of the first set of processes are conducted via at least one first client device.

In some aspects, the techniques described herein relate to a computer program product, wherein the first set of authentication credentials and the second set of authentication credentials provide access to the first dataset via open authorization.

In some aspects, the techniques described herein relate to a computer program product, wherein each of the first set of authentication credentials and the second set of authentication credentials comprise access tokens associated with the first dataset.

In some aspects, the techniques described herein relate to a computer program product, wherein the one or more computer-readable program code portions include at least one executable portion further configured to cause a transmission of a third request for authentication for a second authentication server, wherein the third request for authentication is associated with the first dataset; receive a third set of authentication credentials associated with the first dataset in response to the third request for authentication, wherein the third set of authentication credentials is valid for a third time period; cause a transmission of the third set of authentication credentials to a second set of processes, wherein the second set of processes comprises at least two processes, wherein each of the second set of processes use the third set of authentication credentials to access data in the first dataset to process during the third time period; cause a transmission of a fourth request for authentication for the second authentication server, wherein the fourth request for authentication is associated with the first dataset, wherein the fourth request for authentication is transmitted within the third time period in which the first set of authentication credentials is valid; receive a fourth set of authentication credentials associated with the first dataset in response to the fourth request for authentication, wherein the fourth set of authentication credentials is valid for a fourth time period; and cause a transmission of the fourth set of authentication credentials to the second set of processes, wherein each of the second set of processes use the fourth set of authentication credentials to access data in the first dataset to process during the fourth time period.

In some aspects, the techniques described herein relate to a computer program product, wherein the first time period and the third time period overlap.

In some aspects, the techniques described herein relate to a computer program product, wherein the second time period and the fourth time period overlap.

In some aspects, the techniques described herein relate to a computer program product, wherein converting each of the one or more first data packets into the readable textual format may include removing at least one syntax value from the one or more first data packets.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings.

DETAILED DESCRIPTION

Figure 1:
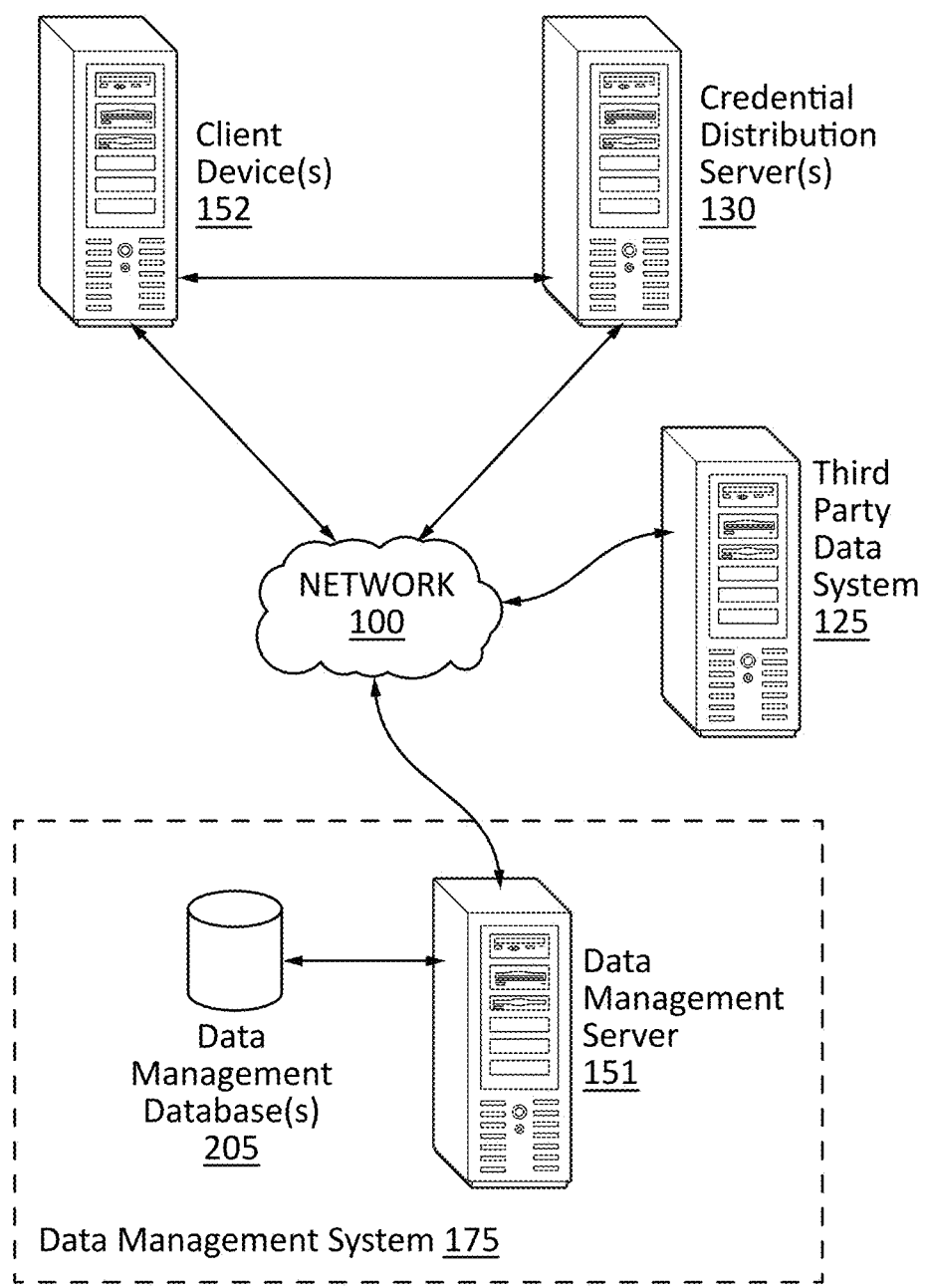
FIG. 1 provides a block diagram illustrating a system environment for preserving security authentication for multi-threaded data processing, in accordance with various embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements.

Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms "comprise," "comprises", and "comprising" are used in a non-exclusive sense, except where the context requires otherwise. Likewise, the term "includes" and its grammatical variants are intended to be non-limiting, such that recitation of items in a list is not to the exclusion of other like items that can be substituted or added to the listed items.

I. Example Use Case

Companies, organizations, persons, or other entities ("entity or entities") often have data regarding customers, clients, assets, finances, persons, objects, processes, and/or things that the entity would like to organize, process, store, and retrieve. Collectively, such data may be referred to as entity data. The entity data may be accessed by a client device in order to precipitate the data. To do this, the client devices may be provided an open Application Programming Interface (API) to provide access to the entity data using authentication credentials. For example, the authentication credentials may be OAUTH 1.0, OAUTH 2.0, and/or other open authentication protocols. However, systems that utilize authentication credentials are typically only meant to be used by a single process and/or user. Additionally, there is often a finite number of API credentials available. As such, each process must be authenticated and the number of concurrent processes are limited. For example, in an instance in which more than one process is running at a time, and the authentication is part of the process, then in an instance in which one process updates authentication, the authentication will break for the other processes that were using those credentials. As such, there is a need to be able to adhere to authentication protocols without limiting the processes being ran at a time.

In order to expedite the process of precipitating large databases within a pre-determined time period, systems of various embodiment allow multiple simultaneous parallel processes to be ran as opposed to a single sequential process. For example, in an instance in which there are 10,000 records to process, the system may have ten precipitation processes (part of a first set of processes, as discussed herein) that run concurrently (or at least near concurrently) and each process 1,000 records. As such, the precipitation processing is completed faster. The enormity of cloud computing continually increases the amount of data to be processed and the present disclosure allows the data to be processed faster without presenting security concerns.

Various embodiments of the present disclosure provide for multiple processes to be conducted in parallel. Various embodiments allow authentication credentials to be shared across different processes without hindering other processes. The system includes one or more credential distribution server(s) that request sets of authentication credentials and distributes the sets of authentication credentials to different processes to be used. Each set of authentication credentials may have a time period in which the given set of authentication credentials are active. The system may request a new set of authentication credentials (e.g., a second set of authentication credentials) before a previous set of authentication credentials (e.g., a first set of authentication credentials) expires. As such, the system provides for multiple processes to use a set of authentication credentials and for credentials to be updated for a seamless precipitation process. In various embodiments, only a single set of authentication credentials may be active at a certain time (e.g., the first set of authentication credentials may be valid for a first time period and the second set of authentication credentials may be valid for a second time period after the first time period).

In an example embodiment, a method for providing authentication across multiple processes is provided. The example method includes causing a transmission of a first request for authentication for a first authentication server. The first request for authentication is associated with a first dataset. The method also includes receiving a first set of authentication credentials associated with the first dataset in response to the first request for authentication. The first set of authentication credentials is valid for a first time period. The method further includes causing a transmission of the first set of authentication credentials to a first set of processes. The first set of processes comprises at least two processes. Each of the first set of processes use the first set of authentication credentials to access data in the first dataset to process during the first time period. The method still further includes causing a transmission of a second request for authentication for the first authentication server. The second request for authentication is associated with the first dataset and the second request for authentication is transmitted within the first time period in which the first set of authentication credentials is valid. The method also include receiving a second set of authentication credentials associated with the first dataset in response to the second request for authentication. The second set of authentication credentials is valid for a second time period. The method further includes causing a transmission of the second set of authentication credentials to the first set of processes. Each of the first set of processes use the second set of authentication credentials to access data in the first dataset to process during the second time period.

In various embodiments, systems and/or computer program products may be provided configured to carry out the operations of the method discussed herein.

II. With Reference to the FIGs.

Reference will now be made in detail to aspects of the disclosure, examples of which are illustrated in the accompanying drawings. The following description refers to the accompanying drawings in which the same numbers in different drawings represent the same or similar elements unless otherwise represented. The implementations set forth in the following description do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms and/or definitions incorporated by reference.

Systems, methods, and apparatuses are described herein which relate generally to preserving security authentication for multi-threaded data processing. In the following description, for purposes of explanation, numerous specific details are set forth to provide a thorough understanding of the present disclosure. It will be evident, however, to one skilled in the art that the present disclosure may be practiced without these specific details and/or with any combination of these details.

Referring now to FIG. 1, a block diagram illustrating a system environment ("system") for preserving security authentication for multi-threaded data processing, in accordance with various embodiments is provided. The system includes client device(s) 152, credential distribution server(s) 130, third party data system 125, and a data management system 175 connected to a network 100. As shown, the client device(s) 152 are capable of conducting one or more processes associated with data precipitation. The client device(s) 152 are in communication with network 100. The client device(s) 152 may be in communication with any of the components shown in FIG. 1 (e.g., via the network 100 and/or other methods).

The credential distribution server(s) 130 are capable of receiving authentication credentials and/or transmitting authentication credentials. As discussed herein, the credential distribution server(s) 130 may receive one or more sets of authentication credentials from the third party data system 125 and/or the data management system 175. Each of the credential distribution server(s) 130 may be connected to a single client device capable of performing multiple processes and/or each of the credential distribution server(s) 130 may be connected to multiple client devices.

In various embodiments, a first credential distribution server of the credential distribution server(s) 130 may be connected to a first client device of the client device(s) 152 that is capable of performing a first set of processes. Additional credential distribution server(s) of the credential distribution server(s) 130 may be connected to other client device(s) of the client device(s) 152 to that is capable of performing additional sets of processes (e.g., a second set of processes, a third set of processes, etc.). The credential distribution server(s) 130 may transmit any number of sets of authentication credentials to the appropriate client device for the client device(s) to access the desired data.

The third party data system 125 may be a CRM and/or CMS system. The third party data system 125 may have the dataset(s) being processed herein. For example, the third party data system 125 may transmit the dataset(s) to the data management system 175 and/or allow access to the client device(s) 152 directly. The data from the third party data system 125 may be associated with one or more entities and the entity may desire to precipitate the data using the operations discussed herein.

Figure 4:
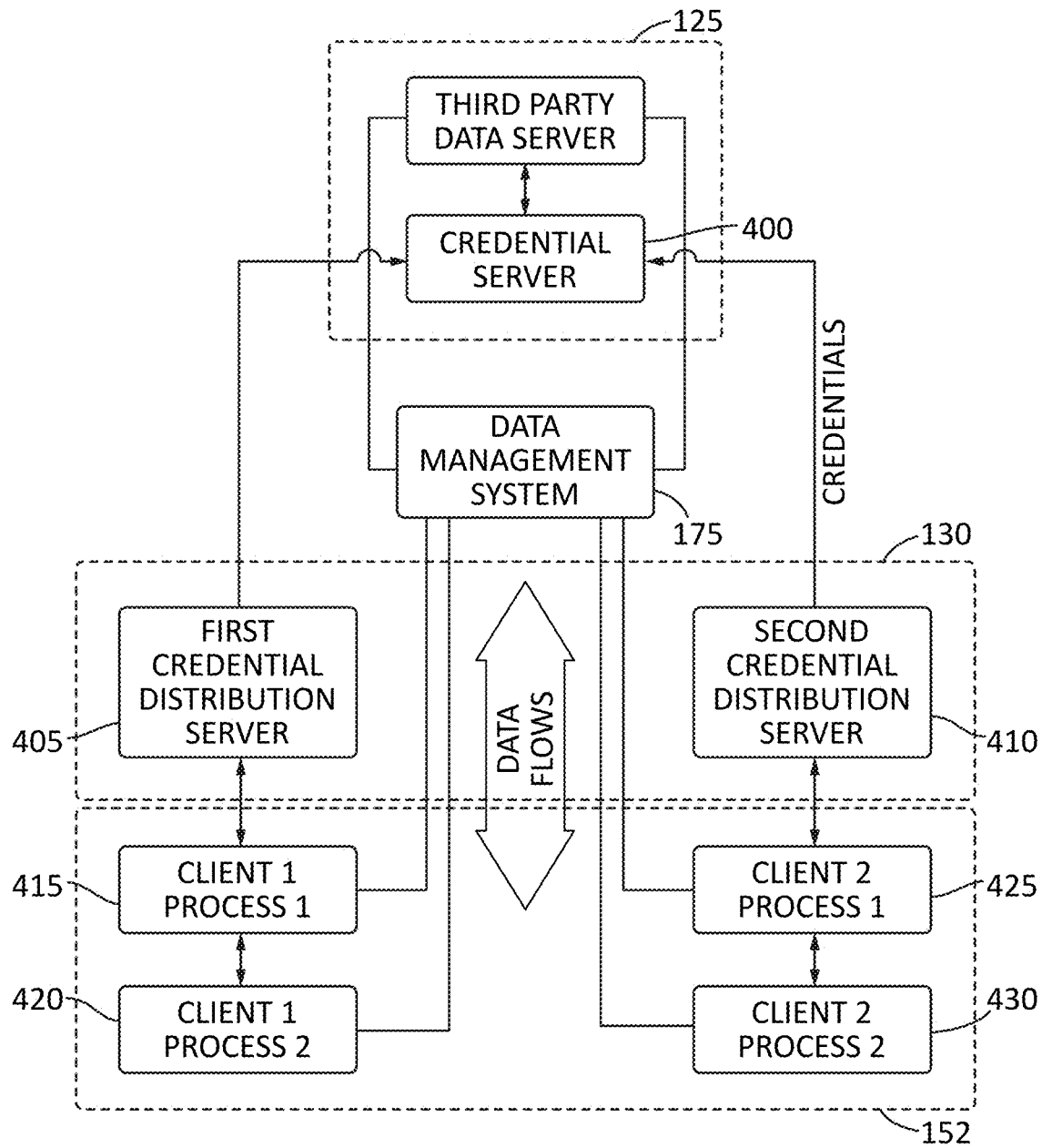
FIG. 4 illustrates an example data flow across the system environment, in accordance with various embodiments of the present disclosure.

The third party data system 125 may include or otherwise be connected to a credential server 400 (shown in FIG. 4). The credential server 400 may generate set(s) of authentication credentials. The set(s) of authentication credentials may be generated based on a validation of authorization (e.g., a validation that the requesting client device and/or user is authorized to view the data being credentialed).

The credential server 400 may issue set(s) of authentication credentials via an open authentication standard, such as OAUTH 1.0 OAUTH 2.0, and/or the like. OAUTH, for example, is an open standard for access delegation, commonly used as a way for network users to grant websites or applications access to their information on other websites but without giving them the passwords. This mechanism is used to permit users to share information about their accounts with third-party applications or websites. A process is issued a set of authentication credentials for each process. Traditionally, running parallel processes on a single set of credentials is not possible because they will invalidate each other. However, the credential distribution server 130 provides for using a set of authentication credentials for multiple processes. The authentication credentials may be in the form of an accessibility token that may be verified to confirm authorization for access to a given dataset. While the credentials discussed herein are mostly discussed in reference to open authentication, any number of different authentication protocols may be used in various embodiments. As such, various embodiments may be used to allow multiple processes to be performed concurrently without causing issues relating to authentication.

The data management system 175 is also in communication with the network 100. The data management system 175 includes one or more data management servers 151 and one or more data management databases 205. In various embodiments, the data management server(s) 151 may be made of multiple servers. In various embodiments, the data management database(s) 205 may be part of the data management server(s) 151 (e.g., at least a portion of the data management database(s) 205 may be stored on the memory device(s) 268 of the data management server(s) 151). Additionally or alternatively, at least a portion of the data management database(s) 205 may be stored remote from the data management server(s) 151.

The data management system 175 may receive dataset(s) from the third party data system 125 (e.g., the dataset(s) discussed herein may be stored in the data management database(s) 205). For example, the data management system 175 may receive one or more datasets (e.g., first dataset, second dataset, etc.) from a data source (e.g., the third party data system 125). As detailed herein, a dataset (e.g., from a data source) may be accessible using an active set of authentication credentials.

In various embodiments, the active set of authentication credentials is first set of authentication credentials during the first time period and the active set of authentication credentials is second set of authentication credentials during the second time period. In various embodiments, only a single set of authentication credentials may be active at a time (e.g., the first time period in which the first set of authentication credentials is the active set of authentication credentials does not overlap with the second time period in which the second set of authentication credentials is the active set of authentication credentials). In various embodiments, in an instance in which two time periods (e.g., a first time period and a second time period), only one of the two time periods may have authority (e.g., only one of the sets of authentication credentials may be valid). In various embodiments, the authority may be based on the time in which the set of authentication credentials was issued (e.g., a second set of authentication credentials may be the active set of authentication credentials during a time in which the first time period and the second time period overlap).

In various embodiments, the data management system 175 may not necessarily store the dataset(s) from the third party data system 125, but is capable of communicating with the third party data system 125, the credential distribution server(s) 130, and/or the client device(s) 152. The data management system 175 may allow access to dataset(s) based on the set(s) of credentials from the third party data system 125.

The data management database(s) 205 may be part or, or in communication with the data management system 175. The data management database(s) 205 may include entity data for one or more entities. The data management database(s) 205 may include the entity data across multiple entities (e.g., a vendor may store and/or provide entity data for multiple entities).

Figure 2:
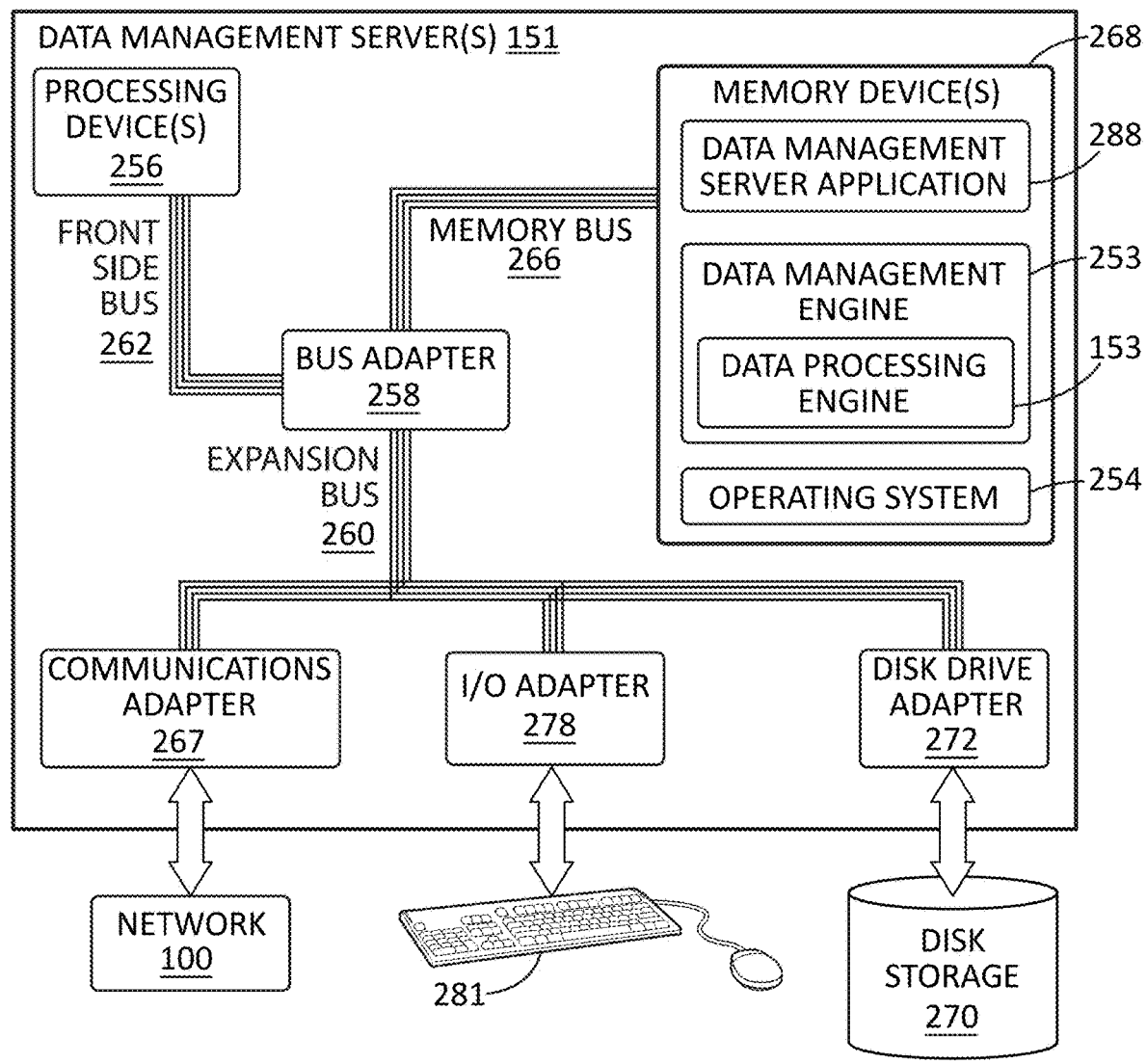
FIG. 2 provides a block diagram illustrating the data management server(s) 151 of FIG. 1, in accordance with various embodiments of the present disclosure.

Referring now to FIG. 2, a block diagram illustrating the data management server(s) 151 of FIG. 1, in accordance with various embodiments is provided. FIG. 2 is merely illustrative an example data management server(s) 151. In various embodiments, the data management server(s) 151 may share components with the client device(s) 152 (e.g., the data management server(s) 151 may use at least a portion of the processing device(s) 356 of the client device(s) 152 shown in FIG. 3). The data management server(s) 151 may be comprised of one or more servers. In various embodiments, the data management server(s) 151 may be capable of processing user inputs via a client device(s) 152 and generating user interfaces to be rendered to client device(s) 152.

The data management server(s) 151 of FIG. 2 includes one or more processing devices 256 and one or more memory devices 268, communication adapter 267, an input/output adapter 278, and a disk drive adapter 272. In various embodiments, the various components may be connected to one another via a BUS adapter 258 (e.g., the processing device(s) 256 may be attached via a front side BUS 262, the memory device(s) 268 may be attached via a memory BUS 266, and the communication adapter 267, I/O adapter 278, disk drive adapter 272, and/or other interfaces may be attached via expansion BUS 260).

It should be understood that the memory device(s) 268 may include one or more databases or other data structures/repositories. The memory device(s) 268 also includes computer-executable program code that instructs the processing device(s) 256 to operate the network communication interface (e.g., communication adapter 267) to perform certain communication functions of the system described herein. For example, in one embodiment of the data management server(s) 151, the memory device(s) 268 includes, but is not limited to, a data management server application 288, a data management engine 253, and an operating system 254. The data management engine 253 may also include a data processing engine 153, and/or the like with instructions to carry out the processing of the entity data. The data management server(s) 151 may permit access to data via the authentication credentials.

Some embodiments of the data management server(s) 151 include processing device(s) 256 communicably coupled to such components as the memory device(s) 268, the communication adapter 267, the input/output adapter 278, the disk drive adapter 272, and/or the like. The processing device(s) 256, and other processors described herein, generally include circuitry for implementing communication and/or logic functions of the system. For example, the processing device(s) 256 may include a digital signal processor device, a microprocessor device, and various analog to digital converters, digital to analog converters, and/or other support circuits. Control and signal processing functions of the data management server(s) 151 are allocated between these devices according to their respective capabilities. The processing device(s) 256 thus may also include the functionality to encode and interleave messages and data prior to modulation and transmission. The processing device(s) 256 can additionally include an internal data modem. Further, the processing device(s) 256 may include functionality to operate one or more software programs, which may be stored in the memory device(s) 268. For example, the processing device(s) 256 may be capable of operating a connectivity program to communicate via the communication adapter 267.

The processing device(s) 256 is configured to connect to the network 100 via the communication adapter 267 to communicate with one or more other devices on the network 100. In this regard, the communication adapter 267 may include various components, such as an antenna operatively coupled to a transmitter and a receiver (together a "transceiver"). The processing device(s) 256 is configured to provide signals to and receive signals from the transmitter and receiver, respectively. The signals may include signaling information in accordance with the air interface standard of the applicable cellular system of the network 100. In this regard, the data management server(s) 151 may be configured to operate with one or more air interface standards, communication protocols, modulation types, and access types. By way of illustration, the data management server(s) 151 may be configured to operate in accordance with any of a number of first, second, third, fourth, and/or fifth-generation communication protocols and/or the like. In various embodiments, the data management server(s) 151 may also be connected via other connection methods to one or more components of the data management system 175.

The I/O adapter 278, which allow the data management server(s) 151 to receive data from a user such as a system administrator, may include any of a number of devices allowing the data management server(s) 151 to receive data from the user, such as a keypad, keyboard 281, touch-screen, touchpad, microphone, mouse, joystick, other pointer device, button, soft key, and/or other input device(s). The user interface may also include a camera, such as a digital camera.

The disk drive adapter 272 may provide additional storage space via disk storage 270. Various other storage mediums may also be used by the data management server(s) 151, such as cloud storage (e.g., transmitted via the communication adapter 267).

Figure 3:
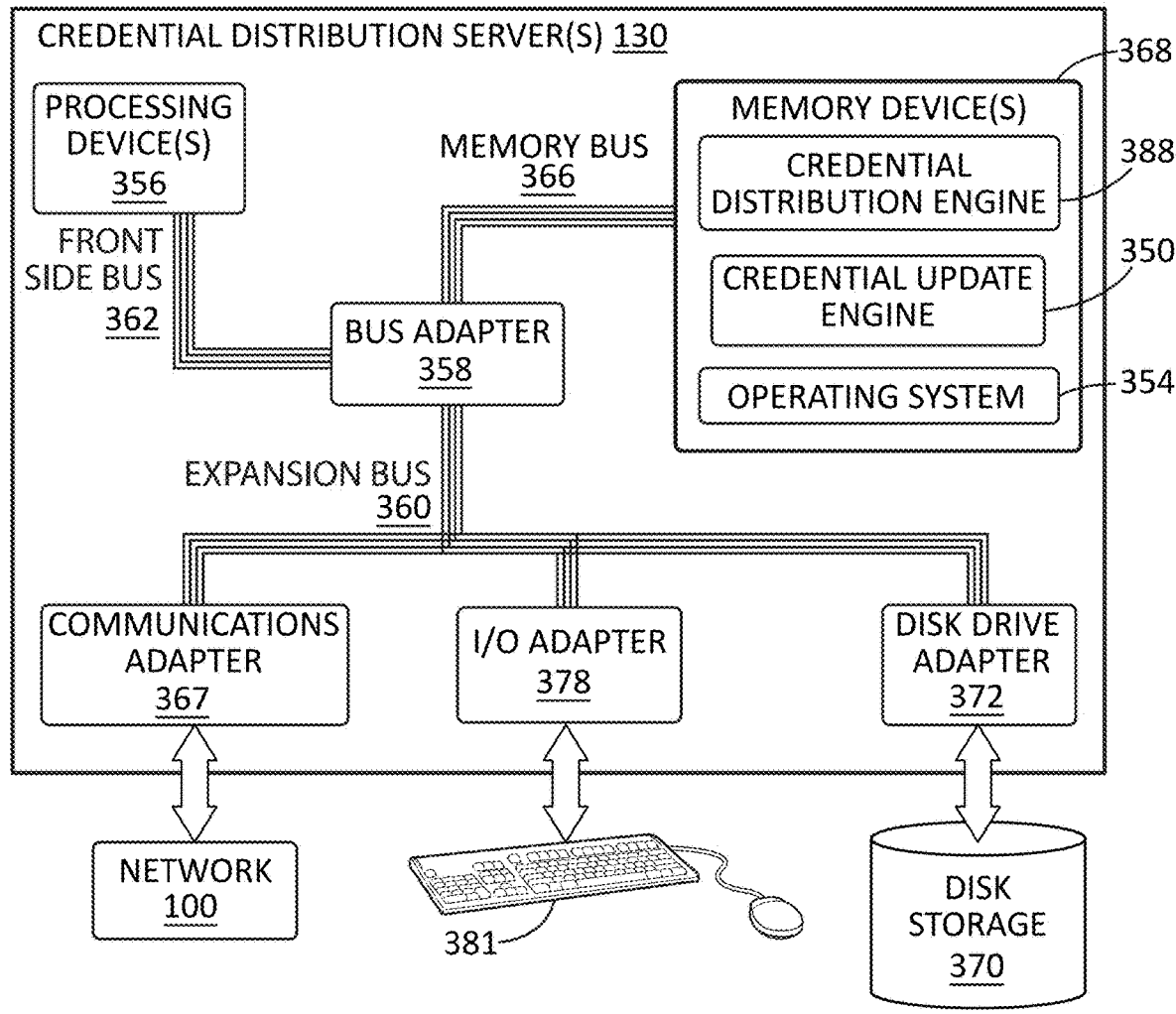
FIG. 3 provides a block diagram illustrating the credential distribution server(s) 130 of FIG. 1, in accordance with various embodiments of the present disclosure.

Referring now to FIG. 3, a block diagram illustrating the credential distribution server(s) 130 of FIG. 1, in accordance with various embodiments is provided. FIG. 3 is merely illustrative an example credential distribution server(s). The client device(s) 152 may include one or more components (e.g., processing device(s), memory device(s), etc.) that are included in the credential distribution server(s) 130 (e.g., various types of client device(s) 152 may be used or otherwise contemplated for the system). The credential distribution server(s) 130 may be capable of performing any of the processes discussed herein.

The credential distribution server(s) 130 of FIG. 3 includes one or more processing devices 356, one or more memory devices 368, a communication adapter 367, an input/output adapter 378, and a disk drive adapter 372. In various embodiments, the various components may be connected to one another via a BUS adapter 358 (e.g., the processing device(s) 356 may be attached via a front side BUS 362, the memory device(s) 368 may be attached via a memory BUS 366, and the communication adapter 367, I/O adapter 378, disk drive adapter 372, and/or other interfaces may be attached via expansion BUS 360).

It should be understood that the memory device(s) 368 may include one or more databases or other data structures/repositories. The memory device(s) 368 also includes computer-executable program code that instructs the processing device(s) 356 to operate the network communication interface (e.g., communication adapter 367) to perform certain communication functions of the system described herein. The memory device(s) 368 may include a credential distribution engine 388 with instructions on requesting authentication credential(s) and/or distributing authentication credential(s) to processes. The memory device(s) 368 also includes a credential update engine 350 that includes instructions on updating authentication credentials as discussed herein. The memory device(s) 368 may also include the operating system 354 of the credential distribution server(s) 130.

Some embodiments of the credential distribution server(s) 130 include processing device(s) 356 communicably coupled to such components as the memory device(s) 368, the communication adapter 367, the input/output adapter 378, the disk drive adapter 372, and/or the like. The processing device(s) 356, and other processors described herein, generally include circuitry for implementing communication and/or logic functions of the system. For example, the processing device(s) 356 may include a digital signal processor device, a microprocessor device, and various analog to digital converters, digital to analog converters, and/or other support circuits. Control and signal processing functions of the credential distribution server(s) 130 are allocated between these devices according to their respective capabilities. The processing device(s) 356 thus may also include the functionality to encode and interleave messages and data prior to modulation and transmission. The processing device(s) 356 can additionally include an internal data modem. Further, the processing device(s) 356 may include functionality to operate one or more software programs, which may be stored in the memory device(s) 368. For example, the processing device(s) 356 may be capable of operating a connectivity program to communicate via the communication adapter 367.

The processing device(s) 356 is configured to connect to the network 100 via the communication adapter 367 to communicate with one or more other devices on the network 100.

In this regard, the communication adapter 367 may include various components, such as an antenna operatively coupled to a transmitter and a receiver (together a "transceiver"). The processing device(s) 356 is configured to provide signals to and receive signals from the transmitter and receiver, respectively. The signals may include signaling information in accordance with the air interface standard of the applicable cellular system of the network 100. In this regard, the credential distribution server(s) 130 may be configured to operate with one or more air interface standards, communication protocols, modulation types, and access types. By way of illustration, the credential distribution server(s) 130 may be configured to operate in accordance with any of a number of first, second, third, fourth, and/or fifth-generation communication protocols and/or the like).

The I/O adapter 378, which allow the credential distribution server(s) 130 to receive data from a user such as a system administrator, may include any of a number of devices allowing the credential distribution server(s) 130 to receive data from the user, such as a keypad, keyboard 381, touch-screen, touchpad, microphone, mouse, joystick, other pointer device, button, soft key, and/or other input device(s). The user interface may also include a camera, such as a digital camera.

The disk drive adapter 372 may provide additional storage space via disk storage 370. Various other storage mediums may also be used by the credential distribution server(s) 130, such as cloud storage (e.g., transmitted via the communication adapter 367).

Referring now to FIG. 4, an example flowchart of data communication of the environment discussed herein is provided. As shown, the third party data system 125 may be in communication with the data management system 175. The data management system 175 may be connected to the client device(s) 152 and/or the credential distribution server(s) 130. FIG. 4 illustrates an example connection between the components discussed herein. Unless otherwise stated, any of the components may carry out any feature of the operations discussed herein.

As shown in FIG. 4, the third party data system 125 (e.g., the third party data server and/or the credential server) may be in communication (e.g., via the network 100) with the data management system 175. The data management system 175 may receive the dataset(s) discussed herein. However, the data management system 175 may not receive the password and/or other authentication credentials for accessing the dataset(s). As such, the dataset(s) may be transmitted to the data management system 175 while preserving the data security. As such, the third party data system 125 maintains any passwords or other authentication credentials.

The data management system 175 (e.g., via the credential server 400) may verify access to a dataset by generating and providing set(s) of authentication credentials. The set(s) of authentication credentials may be issued to an individual user or client device. As discussed herein, the term client device refers to one or more computing devices that are capable of accessing a dataset using a single set of authentication credentials.

Traditionally, a set of authentication credentials may be limited to a single process (e.g., different processes may each require individual authorization that may hinder the other processes). However, the present disclosure provides credential distribution server(s) 130 that are capable of requesting and/or transmitting set(s) of authentication credentials to multiple processes to use simultaneously. In various embodiments, the credential distribution server(s) 130 may have any number of credential distribution servers.

As shown, a first credential distribution server 405 may be in communication with the credential server 400 and the one or more processes of a first client device (e.g., process 1 415, process 2 420, etc.) of the client device(s) 152, and a second credential distribution server 410 may be in communication with the credential server 400 and the one or more processes of a second client device (e.g., process 1 425, process 2 430, etc.) of the client device(s) 152. Each of the processes of a client device (e.g., process 1 415 and process 2 420 of the first client device and/or process 1 425 and process 2 430 of the second client device) may receive a set of authentication credentials (e.g., an active set of authentication credentials, as discussed herein), and access the dataset(s) via the data management system 175 using the set of authentication credentials. Any number of credential distribution server(s) may be contemplated and the example of FIG. 2 with two credential distribution servers is merely an example. Additionally, while each client device 152 shown in FIG. 4 has a dedicated credential distribution server, a single credential distribution server may be capable of providing authentication credentials across multiple client devices.

In various embodiments, the set(s) of authentication credentials may be time-based, such that each set of authentication credentials has a time period in which the set of authentication credentials is active (e.g., works to access the given dataset). As such, a first set of authentication credentials may be valid for a first time period. During the first time period, the first set of authentication credentials may be considered an active set of authentication credentials. At the conclusion of the first time period, the first set of authentication credentials is no longer valid and are therefore no longer considered to be an active set of authentication credentials. Therefore, a new set of authentication credentials (e.g., a second set of authentication credentials) are required in order to continue access to the dataset.

Figure 5:
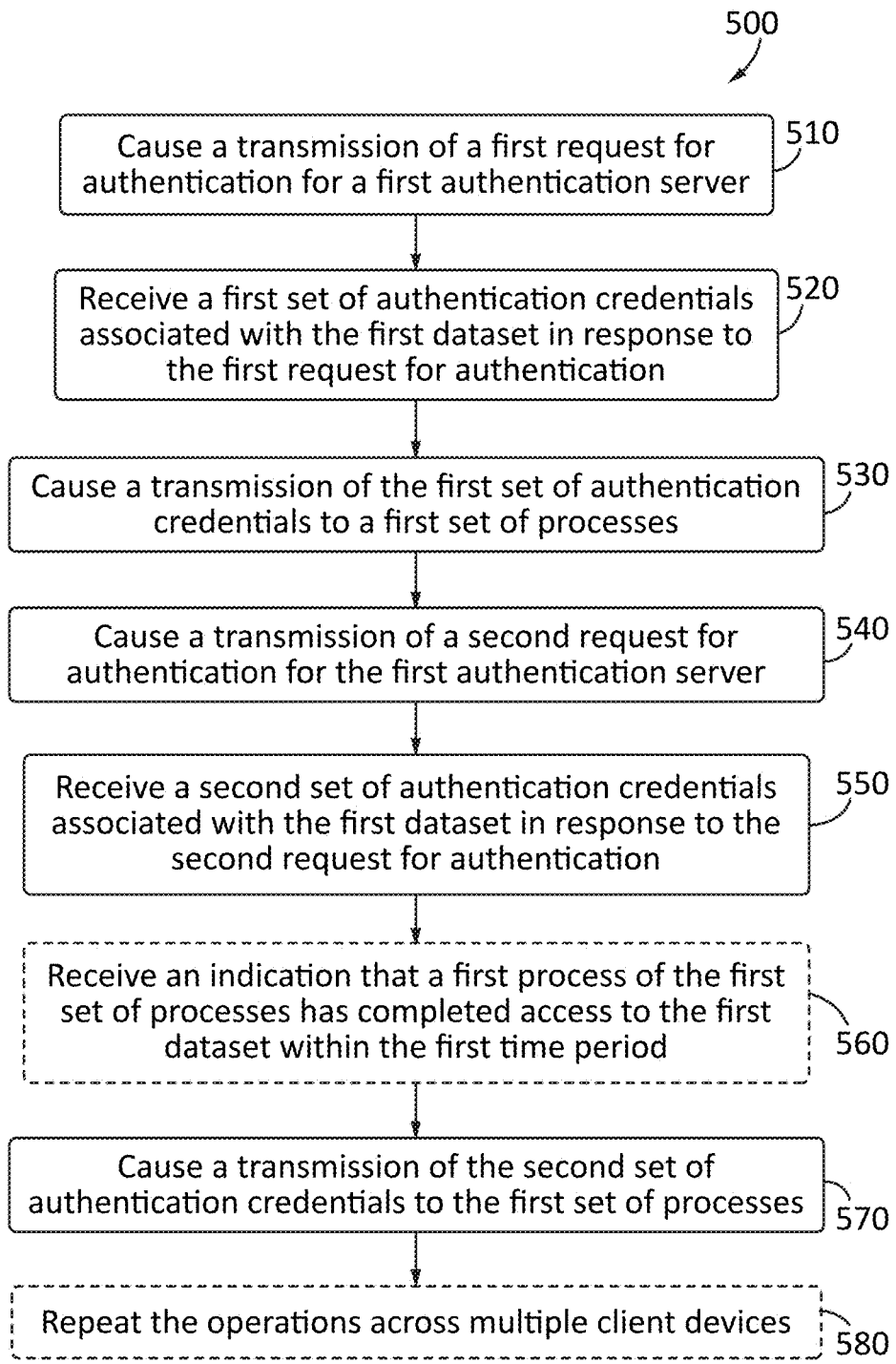
FIG. 5 is a flowchart 500 illustrating a method of providing authentication across multiple processes, in accordance with various embodiments of the present disclosure.

As discussed in more detail in reference to FIG. 5, the environment (e.g., the credential distribution server(s) 130) may monitor the time period in which a first set of authentication credentials is valid and request a new set of authentication credentials before the first time period has lapsed. For example, the system may request a new set of authentication credentials at a predetermined amount of time before the expiration of the first set of authentication credentials (e.g., one minute before the expiration of the first time period). The predetermined amount of time before the expiration of the first set of authentication credentials may be based on various factors, such as the speed of receiving a new set of authentication credentials, speed of distribution of the new set of authentication credentials to the processes, and/or the like. As such, the predetermined amount of time before the expiration of the first set of authentication credentials may be an amount of time in which the new set of authentication credentials may be received and implemented without a disruption to the access by the processes. The renewal of the set of authentication credentials may be repeated any number of times. For example, the system may request new sets of authentication credentials until the processes are complete.

The credential distribution server(s) 130 may distribute the set(s) of authentication credentials directly to each process (e.g., the credential distribution server(s) 130 may transmit the set of authentication credentials to each of the at least two processes). Alternatively, the credential distribution server(s) 130 may transmit the set of authentication credentials to less than all of the processes (e.g., one of the processes) and the client device may distribute the set of authentication credentials across each process.

In various embodiments, the set of authentication credentials may also indicate the amount of access to the dataset(s) that a process is allowed. For example, a client device that is performing one or more processes may only have access to a subset of the dataset and/or the ability of the client device to interact with the dataset(s) may be limited (e.g., read only, download capability, etc.). In various embodiments, the access to dataset(s) may be limited to data necessary to perform the processes of the client device(s). For example, an entity may only be allowed access to data in a dataset associated with the entity and not be allowed access to data associated with other entities. As such, the set of authorized credentials may indicate the data to be accessed, the time period of access, and/or the like.

Referring now to FIG. 5, a flowchart 500 is provided illustrating a method of preserving security authentication for multi-threaded data processing by providing authentication across multiple processes, in accordance with various embodiments. The method of FIG. 5 may be carried out using processing device(s) of any number of components, such as a processing device within client device(s) 152, credential distribution server(s) 130, data management system 175, and/or the like. As such, the operations herein may be carried out by any of the embodiments herein unless otherwise stated. Unless otherwise stated, the operations of FIG. 5 may be carried out by the same system, such as the systems of various embodiments discussed herein.

Referring now to Block 510 of FIG. 5, the method includes causing a transmission of a first request for authentication for a first authentication server. The first request for authentication is associated with a first dataset. The first request for authentication may be transmitted via one of the credential distribution server(s) 130. The first request for authentication may be associated with a client device and/or user (e.g., to allow a client device to access the first dataset). In various embodiments, the first request for authentication may be related to multiple datasets (e.g., a first dataset, a second dataset, etc.). The first request for authentication may be associated with entity data to be precipitated using one or more processes.

Referring now to Block 520 of FIG. 5, the method includes receiving a first set of authentication credentials associated with the first dataset in response to the first request for authentication. The first set of authentication credentials may include information for accessing the first dataset. The first set of authentication credentials (and any other set of authentication credentials) may be provide access to the given dataset (e.g., the first dataset) via open authorization. For example, the authentication may use OAUTH 1.0 and/or OAUTH 2.0 protocols. Each set of authentication credentials (e.g., the first set of authentication credentials, the second set of authentication credentials, etc.) may include an access token associated with the given dataset (e.g., the first dataset).

The first set of authentication credentials may be valid for a first time period. During the first time period, the first set of authentication credentials may be considered an active set of authentication credentials. An active set of authentication credentials may be any set of authentication credentials that are currently valid. As such, the first set of authentication credentials is valid during the first time period. The first dataset (and/or other datasets) may be inaccessible without a valid set of authentication credentials for the given dataset.

The first time period may run from the time the first set of authentication credentials is requested, the time the first set of authentication credentials is generated, the time the first set of authentication credentials is received, and/or the like. In various embodiments, the first time period may be a period of time in the future (e.g., a first set of authentication credentials may be generated and transmitted before the first set of authentication credentials becomes valid). At the expiration of the first time period, the first set of authentication credentials is deactivated and are no longer valid to allow access to the given dataset.

In various embodiments, the first set of authentication credentials may also be deactivated for non-time related reasons. For example, the first set of authentication credentials may be deactivated due to events occurring (e.g., authorization may be revoked, data processing may be completed, etc.), changes in the dataset (e.g., changes in the data set may cause a deactivation of credentials), and/or the like. As such, the credential distribution server(s) 130 may perform the operations discussed in reference to FIG. 5 in an instance in which a non-time related reason for deactivating the active set of authentication credentials occurs. For example, the credential distribution server(s) 130 may request a new set of authentication credentials in an instance in which an event occurs that is known to deactivate credentials.

While the first set of authentication credentials, the features discussed herein may apply to any number of sets of authentication credentials (e.g., a second set of authentication credentials, a third set of authentication credentials, etc.). For example, each set of authentication credentials may have a time period in which the given set of authentication credentials is valid. Similarly, while the terms first, second, third, etc. are used, the features are not limited to any given numbered component.

Referring now to Block 530 of FIG. 5, the method includes causing a transmission of the first set of authentication credentials to a first set of processes. In various embodiments, the first set of processes may include at least two processes. A process may correspond to an individual processing thread. Each process may be defined on individual processing threads on the same client device and/or multiple client devices. Unless otherwise noted, in an instance in which processes are part of a set, said processes are considered to be part of the same client device regardless of whether multiple client devices are present. For example, each of the processes of the first set of processes may be conducted via at least one first client device.

While the first set of processes are discussed in terms of at least two processes, in various embodiments, a set of processes may include a singular process. As such, the operations discussed herein may be carried out for a single process in a similar fashion to the at least two processes discussed herein.

In various embodiments, each of the first set of processes may use the first set of authentication credentials to access data in the first dataset to process during the first time period. As the credential distribution server(s) 130 provides the first set of authentication credentials to the first set of processes, each process may use the same set of authentication credentials without hindering the other processes authentication.

In various embodiments, each of first set of processes performs precipitation processing on a subset of the first dataset. As discussed herein, each process of the first set of processes may perform the same or similar processes on different portions of the given dataset. For example, each of the first set of processes is assigned a distinct subset of the first dataset to process and performs the same or similar processes concurrently to decrease processing time. In various embodiments, each of the assigned distinct subset of the first dataset is processed by the assigned process.

In various embodiments, the precipitation processing may be a same processing operation across each of the first set of processes. For example, the precipitation processing may be the same processing on different subsets of the first dataset. As such, the precipitation processing may be conducted in parallel, allowing the precipitation processing to be completed across the entire first dataset (or the portion of the first dataset being precipitated) in less time.

Referring now to Block 540 of FIG. 5, the method includes causing a transmission of a second request for authentication for the first authentication server. The second request may be the same or similar to the first request (e.g., include information that was included in the first request). As such, the second request for authentication is associated with the first dataset. In various embodiments, the second request for authentication may be in the form of a renewal (e.g., the second request for authentication may reference the first request for authentication, the first set of authentication credentials, the first dataset, etc.).

In various embodiments, the second request for authentication may be transmitted within the first time period in which the first set of authentication credentials is valid. For example, the second request for authentication for the first authentication server may be transmitted at a predetermined amount of time before an expiration of the first time period.

Referring now to Block 550 of FIG. 5, the method includes receiving a second set of authentication credentials associated with the first dataset in response to the second request for authentication. In various embodiments, the second set of authentication credentials is valid for a second time period.

In various embodiments, the second time period may commence at the end of the first time period (e.g., the second set of authentication credentials may become an active set of authentication credentials in an instance in which the first set of authentication credentials expires). Alternatively, the second time period may overlap with the first time period (e.g., the first set of authentication credentials and the second set of authentication credentials may be active sets of authentication credentials for a portion of time). For example, the second time period may begin at the time the second request for authentication is requested and/or transmitted before the expiration of the first time period).

Referring now to optional Block 560 of FIG. 5, the method includes receiving an indication that a first process of the first set of processes has completed access to the first dataset within the first time period. In various embodiments, the first set of processes may be updated. The update to the first set of processes may be based on an event (e.g., change in access), a completion of a process (e.g., a process may be completed). As such, the first set of processes (and any other set(s) of processes) may be updated periodically. The update to a set of authentication credentials may be automatic (e.g., at the triggering of an event) and/or manual (e.g., a user may remove a process that is redundant or unnecessary).

As such, in various embodiments, a first process and/or other processes may be removed from the first set of processes before transmission of the second set of authentication credentials. For example, processes that are already completed may not need additional access to the given dataset, such that the given completed process may not need updated set(s) of authentication credentials. In various embodiments, the first set of processes (and/or other sets of processes) may be updated in order to improve efficiency and avoid providing authentication credentials to processes that do not need the credentials. In various embodiments, the first set of processes (and/or other sets of processes) may be updated periodically and/or based on changes in the processing. In various embodiments, the number of processes in a set of processes may be adjusted in an instance in which the dataset changes in size. For example, the number of processes in a first set of processes may be reduced in an instance in which a first dataset is reduced in size.

Referring now to Block 570 of FIG. 5, the method includes causing a transmission of the second set of authentication credentials to the first set of processes. The transmission of the second set of authentication credentials may be the same or similar to the transmission of the first set of authentication credentials, as discussed above in reference to Block 530 of FIG. 5.

As discussed herein, the second set of authentication credentials may allow access to data in the first dataset during the second time period. The second time period may function the same or similar for the second set of authentication credentials as the first time period does for the first set of authentication credentials.

In various embodiments, the second set of authentication credentials may be transmitted to the first set of processes before the expiration of the first time period. For example, the second set of authentication credentials may be transmitted to the first set of processes before the first set of authentication credentials expires in order to avoid disruption in access to the first dataset.

Referring now to optional Block 580 of FIG. 5, the method includes repeating the operations across multiple sets of processes. In various embodiments, one or more credential distribution server(s) 130 may perform the operations across different sets of processes (e.g., a second set of processes, a third set of processes, etc.).

The present disclosure allows for scalability based on various factors, such as dataset size, number of datasets, types of processes, and/or the like. As such, the number of processes in a set of processes may range based on the data being processed and/or the data expected to be processed. Any number of processes (e.g., one or more processes) may be used. For example, a single process may be used for smaller datasets and the number of processes may be increased as the size of the dataset is increased. In various embodiments, the method may include determining a number of processes in a set of processes (e.g., a first set of processes, a second set of processes, etc.) based on the size of the dataset being processed. For example, the number of processes may be based on the amount of data being processed, the processing speed for each process, the desired time range for processing, and/or the like. Alternatively, a set number of processes may be used regardless of data set size and the amount of data being processed by each process may be changed.

In various embodiments, the method may include causing a transmission of a third request for authentication for a second authentication server. The third request for authentication is associated with the first dataset. The method may also include receiving a third set of authentication credentials associated with the first dataset in response to the third request for authentication. The third set of authentication credentials is valid for a third time period. The method further includes causing a transmission of the third set of authentication credentials to a second set of processes. The second set of processes includes at least two processes and each of the at least two processes use the third set of authentication credentials to access data in the first dataset to process during the third time period. The method still further includes causing a transmission of a fourth request for authentication for the second authentication server. The fourth request for authentication is associated with the first dataset and the fourth request for authentication is transmitted within the third time period in which the first set of authentication credentials is valid. The method also includes receiving a fourth set of authentication credentials associated with the first dataset in response to the fourth request for authentication. The fourth set of authentication credentials is valid for a fourth time period. The method further includes causing a transmission of the fourth set of authentication credentials to the second set of processes. Each of the second set of processes use the fourth set of authentication credentials to access data in the first dataset to process during the fourth time period. The operations may be performed across any number of sets of processes.

In various embodiments, the operations may overlap. For example, the first time period and the third time period may overlap and/or the second time period and the fourth time period may overlap.

Figure 6:
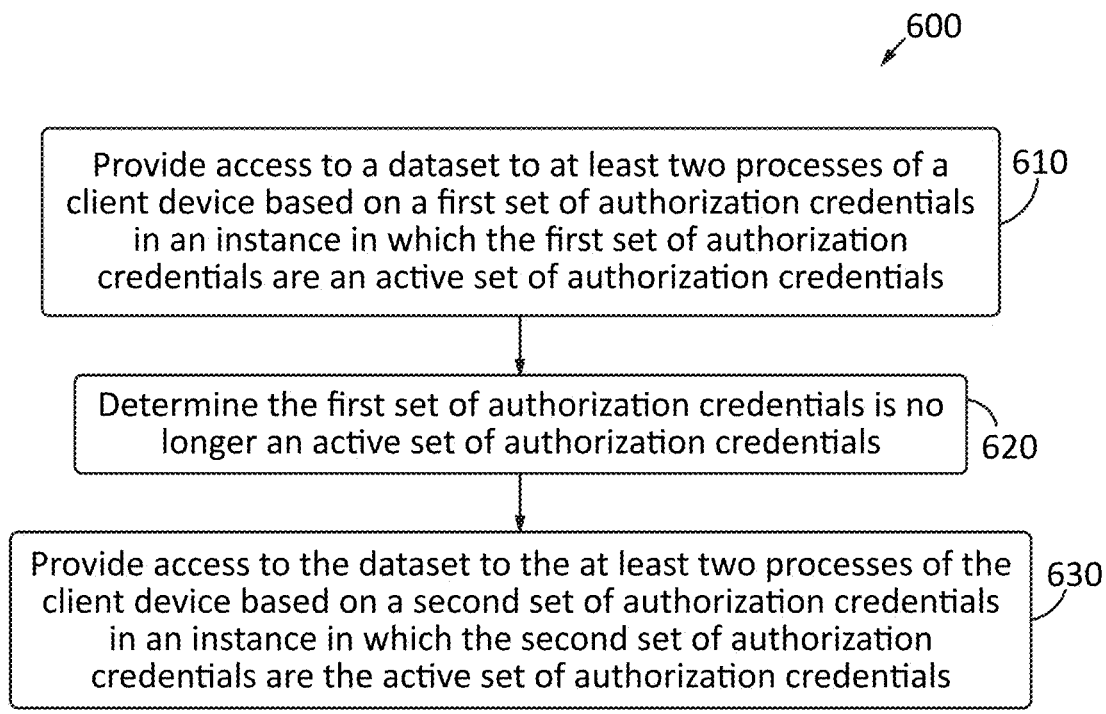
FIG. 6 is a flowchart 600 illustrating a method of providing access to a dataset, in accordance with various embodiments of the present disclosure.

Referring now to FIG. 6, a flowchart 600 is provided that includes an example method of providing access to a dataset. The method may be carried out by any component discussed in reference to FIG. 1, such as the data management system 175 (e.g., in order to provide access to the dataset). Unless otherwise stated, the operations of FIG. 6 may be carried out in connection and/or as part of the operations of FIG. 5. As such, the operations are not exclusory.

Referring now to Block 610 of FIG. 6, the method includes providing access to a dataset to at least two processes of a client device based on a first set of authentication credentials in an instance in which the first set of authentication credentials is an active set of authentication credentials. The process of requesting and distributing the second set of authentication credentials are discussed above in reference to Blocks 510, 520, and 530 of FIG. 5. The data management system 175 may use the authentication credentials discussed in reference to FIG. 5 to confirm the processes have authorization to access the datasets.

The first set of authentication credentials define a first time period in which the first set of authentication credential are active. As discussed herein, the first set of authentication credentials are active (e.g., allow access to a given dataset) during the first time period and then deactivated at the end of the first time period. The operations of providing access may include confirming that the given set of authentication credentials are an active set of authentication credentials.

Referring now to Block 620 of FIG. 6, the method includes determining the first set of authentication credentials is no longer an active set of authentication credentials. The determination that the first set of authentication credentials is no longer an active set of authentication credentials is based on an expiration of the first time period. The system may track the time, such that the system confirms whether the first time period has expired or not. Alternatively, the system (e.g., the data management system 175) may be in contact with the third party data system 125 to confirm whether a set of authentication credentials are active.

Referring now to Block 630 of FIG. 6, the method includes providing access to the dataset to the at least two processes of the client device based on a second set of authentication credentials in an instance in which the second set of authentication credentials is the active set of authentication credentials. The second set of authentication credentials define a second time period in which the second set of authentication credential are active. The process of requesting and distributing the second set of authentication credentials are discussed above in reference to Blocks 540, 550, and 570 of FIG. 5.

In various embodiments, the methods discussed herein may be carried out via a system that includes at least one non-transitory storage device and at least one processing device coupled to the at least one non-transitory storage device. The at least one processing device is configured to perform the operations discussed herein. A computer program product for providing authentication across multiple processes may also be provided. Such a computer program product includes at least one non-transitory computer-readable medium having one or more computer-readable program code portions embodied therein. The one or more computer-readable program code portions include at least one executable portion configured to perform the operations discussed herein.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

III. Claim Clauses

Clause 1: A method for providing authentication across multiple processes, the method comprising: causing a transmission of a first request for authentication for a first authentication server, wherein the first request for authentication is associated with a first dataset; receiving a first set of authentication credentials associated with the first dataset in response to the first request for authentication, wherein the first set of authentication credentials is valid for a first time period; causing a transmission of the first set of authentication credentials to a first set of processes, wherein the first set of processes comprises at least two processes, wherein each of the first set of processes use the first set of authentication credentials to access data in the first dataset to process during the first time period; causing a transmission of a second request for authentication for the first authentication server, wherein the second request for authentication is associated with the first dataset, wherein the second request for authentication is transmitted within the first time period in which the first set of authentication credentials is valid; receiving a second set of authentication credentials associated with the first dataset in response to the second request for authentication, wherein the second set of authentication credentials is valid for a second time period; and causing a transmission of the second set of authentication credentials to the first set of processes, wherein each of the first set of processes use the second set of authentication credentials to access data in the first dataset to process during the second time period.

Clause 2: The method of Clause 1, further comprising receiving the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

Clause 3: The method of Clause 2, wherein the first dataset is inaccessible without the active set of authentication credentials.

Clause 4: The method of Clause 1, wherein the first set of authentication credentials is deactivated at an expiration of the first time period.

Clause 5: The method of Clause 4, wherein the second set of authentication credentials is distributed to the first set of processes before the expiration of the first time period.

Clause 6: The method of Clause 1, further comprising receiving an indication that a first process of the first set of processes has completed access to the first dataset within the first time period, wherein the first process is removed from the first set of processes before transmission of the second set of authentication credentials.

Clause 7: The method of Clause 1, wherein each of first set of processes performs precipitation processing on a subset of the first dataset, wherein each of the first set of processes is assigned a distinct subset of the first dataset to process.

Clause 8: The method of Clause 7, wherein the precipitation processing is a same processing operation across each of the first set of processes.

Clause 9: The method of Clause 7, wherein each of the first set of processes process the subset of the first dataset in parallel.

Clause 10: The method of Clause 7, wherein each of the first set of processes receive access to the first dataset via the first set of authentication credentials during the first time period and via the second set of authentication credentials during the second time period.

Clause 11: The method of Clause 1, wherein each of the first set of processes correspond to a distinct processing thread of a processing device.

Clause 12: The method of Clause 1, wherein the first time period and the second time period overlap for at least a portion of time.

Clause 13: The method of Clause 1, wherein the second time period begins at an expiration of the first time period.

Clause 14: The method of Clause 1, wherein the second request for authentication for the first authentication server is transmitted at a predetermined amount of time before an expiration of the first time period.

Clause 15: The method of Clause 1, wherein each of the first set of processes are conducted via at least one first client device.

Clause 16: The method of Clause 1, wherein the first set of authentication credentials and the second set of authentication credentials provide access to the first dataset via open authorization.

Clause 17: The method of Clause 16, wherein each of the first set of authentication credentials and the second set of authentication credentials comprise access tokens associated with the first dataset.

Clause 18: The method of Clause 1, further comprising causing a transmission of a third request for authentication for a second authentication server, wherein the third request for authentication is associated with the first dataset; receiving a third set of authentication credentials associated with the first dataset in response to the third request for authentication, wherein the third set of authentication credentials is valid for a third time period; causing a transmission of the third set of authentication credentials to a second set of processes, wherein the second set of processes comprises at least two processes, wherein each of the second set of processes use the third set of authentication credentials to access data in the first dataset to process during the third time period; causing a transmission of a fourth request for authentication for the second authentication server, wherein the fourth request for authentication is associated with the first dataset, wherein the fourth request for authentication is transmitted within the third time period in which the first set of authentication credentials is valid; receiving a fourth set of authentication credentials associated with the first dataset in response to the fourth request for authentication, wherein the fourth set of authentication credentials is valid for a fourth time period; and causing a transmission of the fourth set of authentication credentials to the second set of processes, wherein each of the second set of processes use the fourth set of authentication credentials to access data in the first dataset to process during the fourth time period.

Clause 19: The method of Clause 18, wherein the first time period and the third time period overlap.

Clause 20: The method of Clause 18, wherein the second time period and the fourth time period overlap.

Clause 21: A system for providing authentication across multiple processes, the system comprising at least one non-transitory storage device and at least one processing device coupled to the at least one non-transitory storage device. The at least one processing device is configured to cause a transmission of a first request for authentication for a first authentication server, wherein the first request for authentication is associated with a first dataset; receive a first set of authentication credentials associated with the first dataset in response to the first request for authentication, wherein the first set of authentication credentials is valid for a first time period; cause a transmission of the first set of authentication credentials to a first set of processes, wherein the first set of processes comprises at least two processes, wherein each of the first set of processes use the first set of authentication credentials to access data in the first dataset to process during the first time period; cause a transmission of a second request for authentication for the first authentication server, wherein the second request for authentication is associated with the first dataset, wherein the second request for authentication is transmitted within the first time period in which the first set of authentication credentials is valid; receive a second set of authentication credentials associated with the first dataset in response to the second request for authentication, wherein the second set of authentication credentials is valid for a second time period; and cause a transmission of the second set of authentication credentials to the first set of processes, wherein each of the first set of processes use the second set of authentication credentials to access data in the first dataset to process during the second time period.

Clause 22: The system of Clause 21, wherein the at least one processing device is further configured to receive the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

Clause 23: The system of Clause 22, wherein the first dataset is inaccessible without the active set of authentication credentials.

Clause 24: The system of Clause 21, wherein the first set of authentication credentials is deactivated at an expiration of the first time period.

Clause 25: The system of Clause 24, wherein the second set of authentication credentials is distributed to the first set of processes before the expiration of the first time period.

Clause 26: The system of Clause 21, wherein the at least one processing device is further configured to receive an indication that a first process of the first set of processes has completed access to the first dataset within the first time period, wherein the first process is removed from the first set of processes before transmission of the second set of authentication credentials.

Clause 27: The system of Clause 21, wherein each of first set of processes performs precipitation processing on a subset of the first dataset, wherein each of the first set of processes is assigned a distinct subset of the first dataset to process.

Clause 28: The system of Clause 27, wherein the precipitation processing is a same processing operation across each of the first set of processes.

Clause 29: The system of Clause 27, wherein each of the first set of processes process the subset of the first dataset in parallel.

Clause 30: The system of Clause 27, wherein each of the first set of processes receive access to the first dataset via the first set of authentication credentials during the first time period and via the second set of authentication credentials during the second time period.

Clause 31: The system of Clause 21, wherein each of the first set of processes correspond to a distinct processing thread of a processing device.

Clause 32: The system of Clause 21, wherein the first time period and the second time period overlap for at least a portion of time.

Clause 33: The system of Clause 21, wherein the second time period begins at an expiration of the first time period.

Clause 34: The system of Clause 21, wherein the second request for authentication for the first authentication server is transmitted at a predetermined amount of time before an expiration of the first time period.

Clause 35: The system of Clause 21, wherein each of the first set of processes are conducted via at least one first client device.

Clause 36: The system of Clause 21, wherein the first set of authentication credentials and the second set of authentication credentials provide access to the first dataset via open authorization.

Clause 37: The system of Clause 36, wherein each of the first set of authentication credentials and the second set of authentication credentials comprise access tokens associated with the first dataset.

Clause 38: The system of Clause 21, wherein the at least one processing device is further configured to cause a transmission of a third request for authentication for a second authentication server, wherein the third request for authentication is associated with the first dataset; receive a third set of authentication credentials associated with the first dataset in response to the third request for authentication, wherein the third set of authentication credentials is valid for a third time period; cause a transmission of the third set of authentication credentials to a second set of processes, wherein the second set of processes comprises at least two processes, wherein each of the second set of processes use the third set of authentication credentials to access data in the first dataset to process during the third time period; cause a transmission of a fourth request for authentication for the second authentication server, wherein the fourth request for authentication is associated with the first dataset, wherein the fourth request for authentication is transmitted within the third time period in which the first set of authentication credentials is valid; receive a fourth set of authentication credentials associated with the first dataset in response to the fourth request for authentication, wherein the fourth set of authentication credentials is valid for a fourth time period; and cause a transmission of the fourth set of authentication credentials to the second set of processes, wherein each of the second set of processes use the fourth set of authentication credentials to access data in the first dataset to process during the fourth time period.

Clause 39: The system of Clause 38, wherein the first time period and the third time period overlap.

Clause 40: The system of Clause 38, wherein the second time period and the fourth time period overlap.

Clause 41: A computer program product for providing authentication across multiple processes, the computer program product comprising at least one non-transitory computer-readable medium having one or more computer-readable program code portions embodied therein, the one or more computer-readable program code portions comprising at least one executable portion configured to cause a transmission of a first request for authentication for a first authentication server, wherein the first request for authentication is associated with a first dataset; receive a first set of authentication credentials associated with the first dataset in response to the first request for authentication, wherein the first set of authentication credentials is valid for a first time period; cause a transmission of the first set of authentication credentials to a first set of processes, wherein the first set of processes comprises at least two processes, wherein each of the first set of processes use the first set of authentication credentials to access data in the first dataset to process during the first time period; cause a transmission of a second request for authentication for the first authentication server, wherein the second request for authentication is associated with the first dataset, wherein the second request for authentication is transmitted within the first time period in which the first set of authentication credentials is valid; receive a second set of authentication credentials associated with the first dataset in response to the second request for authentication, wherein the second set of authentication credentials is valid for a second time period; and cause a transmission of the second set of authentication credentials to the first set of processes, wherein each of the first set of processes use the second set of authentication credentials to access data in the first dataset to process during the second time period.

Clause 42: The computer program product of Clause 41, wherein the one or more computer-readable program code portions comprise at least one executable portion further configured to receive the first dataset from a data source, wherein the first dataset is accessible using an active set of authentication credentials, wherein the active set of authentication credentials is first set of authentication credentials during the first time period and the active set of authentication credentials is second set of authentication credentials during the second time period. Clause 43: The computer program product of Clause 42, wherein the first dataset is inaccessible without the active set of authentication credentials.

Clause 44: The computer program product of Clause 41, wherein the first set of authentication credentials is deactivated at an expiration of the first time period.

Clause 45: The computer program product of Clause 44, wherein the second set of authentication credentials is distributed to the first set of processes before the expiration of the first time period.

Clause 46: The computer program product of Clause 41, wherein the one or more computer-readable program code portions comprise at least one executable portion further configured to receive an indication that a first process of the first set of processes has completed access to the first dataset within the first time period, wherein the first process is removed from the first set of processes before transmission of the second set of authentication credentials.

Clause 47: The computer program product of Clause 41, wherein each of first set of processes performs precipitation processing on a subset of the first dataset, wherein each of the first set of processes is assigned a distinct subset of the first dataset to process.

Clause 48: The computer program product of Clause 47, wherein the precipitation processing is a same processing operation across each of the first set of processes.

Clause 49: The computer program product of Clause 47, wherein each of the first set of processes process the subset of the first dataset in parallel.

Clause 50: The computer program product of Clause 47, wherein each of the first set of processes receive access to the first dataset via the first set of authentication credentials during the first time period and via the second set of authentication credentials during the second time period.

Clause 51: The computer program product of Clause 41, wherein each of the first set of processes correspond to a distinct processing thread of a processing device.

Clause 52: The computer program product of Clause 41, wherein the first time period and the second time period overlap for at least a portion of time.

Clause 53: The computer program product of Clause 41, wherein the second time period begins at an expiration of the first time period.

Clause 54: The computer program product of Clause 41, wherein the second request for authentication for the first authentication server is transmitted at a predetermined amount of time before an expiration of the first time period.

Clause 55: The computer program product of Clause 41, wherein each of the first set of processes are conducted via at least one first client device.

Clause 56: The computer program product of Clause 41, wherein the first set of authentication credentials and the second set of authentication credentials provide access to the first dataset via open authorization.

Clause 57: The computer program product of Clause 56, wherein each of the first set of authentication credentials and the second set of authentication credentials comprise access tokens associated with the first dataset.

Clause 58: The computer program product of Clause 41, wherein the one or more computer-readable program code portions comprise at least one executable portion further configured to cause a transmission of a third request for authentication for a second authentication server, wherein the third request for authentication is associated with the first dataset; receive a third set of authentication credentials associated with the first dataset in response to the third request for authentication, wherein the third set of authentication credentials is valid for a third time period; cause a transmission of the third set of authentication credentials to a second set of processes, wherein the second set of processes comprises at least two processes, wherein each of the second set of processes use the third set of authentication credentials to access data in the first dataset to process during the third time period; cause a transmission of a fourth request for authentication for the second authentication server, wherein the fourth request for authentication is associated with the first dataset, wherein the fourth request for authentication is transmitted within the third time period in which the first set of authentication credentials is valid; receive a fourth set of authentication credentials associated with the first dataset in response to the fourth request for authentication, wherein the fourth set of authentication credentials is valid for a fourth time period; and cause a transmission of the fourth set of authentication credentials to the second set of processes, wherein each of the second set of processes use the fourth set of authentication credentials to access data in the first dataset to process during the fourth time period.

Clause 59: The computer program product of Clause 58, wherein the first time period and the third time period overlap.

Clause 60: The computer program product of Clause 58, wherein the second time period and the fourth time period overlap.

Therefore, the following is claimed:

1. A method for providing authentication across multiple processes, the method comprising:
    transmitting a first request for authentication for a first authentication server, wherein the first request for authentication is associated with a first dataset;
    receiving a first set of authentication credentials associated with the first dataset in response to the first request for authentication, wherein the first set of authentication credentials is valid for a first time period;
    transmitting the first set of authentication credentials to a first set of processes, wherein the first set of processes comprises at least two processes, wherein each of the first set of processes use the first set of authentication credentials to access data in the first dataset to process during the first time period;
    receiving an indication that a first process of the first set of processes has completed access to the first dataset within the first time period, wherein the first process is removed from the first set of processes before transmission of a second set of authentication credentials;
    transmitting a second request for authentication for the first authentication server, wherein the second request for authentication is associated with the first dataset, wherein the second request for authentication is transmitted within the first time period in which the first set of authentication credentials is valid;
    receiving the second set of authentication credentials associated with the first dataset in response to the second request for authentication, wherein the second set of authentication credentials is valid for a second time period; and
    transmitting the second set of authentication credentials to the first set of processes, wherein each of the first set of processes use the second set of authentication credentials to access data in the first dataset to process during the second time period.

2. The method of claim 1, further comprising receiving the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

3. The method of claim 2, wherein the first dataset is inaccessible without the active set of authentication credentials.

4. The method of claim 1, wherein the first set of authentication credentials is deactivated at an expiration of the first time period, wherein the second set of authentication credentials is distributed to the first set of processes before the expiration of the first time period.

5. The method of claim 1, wherein each of first set of processes performs precipitation processing on a subset of the first dataset, wherein each of the first set of processes is assigned a distinct subset of the first dataset to process, wherein the precipitation processing is a same processing operation across each of the first set of processes.

6. The method of claim 1, wherein the second request for authentication for the first authentication server is transmitted at a predetermined amount of time before an expiration of the first time period.

7. The method of claim 1, wherein the first set of authentication credentials and the second set of authentication credentials provide access to the first dataset via open authorization.

8. A system for providing authentication across multiple processes, the system comprising:

at least one non-transitory storage device, wherein the at least one non-transitory storage device stores instructions; and at least one processing device coupled to the at least one non-transitory storage device, wherein the at least one processing device, upon execution of the instructions stored in the at least one non-transitory storage device, is configured to:

transmit a first request for authentication for a first authentication server, wherein the first request for authentication is associated with a first dataset;

receive a first set of authentication credentials associated with the first dataset in response to the first request for authentication, wherein the first set of authentication credentials is valid for a first time period;

transmit the first set of authentication credentials to a first set of processes, wherein the first set of processes comprises at least two processes, wherein each of the first set of processes use the first set of authentication credentials to access data in the first dataset to process during the first time period;

receive an indication that a first process of the first set of processes has completed access to the first dataset within the first time period, wherein the first process is removed from the first set of processes before transmission of a second set of authentication credentials;

transmit a second request for authentication for the first authentication server, wherein the second request for authentication is associated with the first dataset, wherein the second request for authentication is transmitted within the first time period in which the first set of authentication credentials is valid;

receive the second set of authentication credentials associated with the first dataset in response to the second request for authentication, wherein the second set of authentication credentials is valid for a second time period; and transmit the second set of authentication credentials to the first set of processes, wherein each of the first set of processes use the second set of authentication credentials to access data in the first dataset to process during the second time period.

9. The system of claim 8, wherein the at least one processing device, upon execution of the instructions stored in the at least one non-transitory storage device, is further configured to receive the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

10. The system of claim 9, wherein the first dataset is inaccessible without the active set of authentication credentials.

11. The system of claim 8, wherein the first set of authentication credentials is deactivated at an expiration of the first time period, wherein the second set of authentication credentials is distributed to the first set of processes before the expiration of the first time period.

12. The system of claim 8, wherein each of first set of processes performs precipitation processing on a subset of the first dataset, wherein each of the first set of processes is assigned a distinct subset of the first dataset to process, wherein the precipitation processing is a same processing operation across each of the first set of processes.

13. A computer program product for providing authentication across multiple processes, the computer program product comprising at least one non-transitory computer-readable medium having one or more computer-readable program code portions embodied therein, the one or more computer-readable program code portions comprising at least one executable portion, wherein the at least one executable portion, upon execution by at least one processing device, is configured to:

transmit a first request for authentication for a first authentication server, wherein the first request for authentication is associated with a first dataset;

receive a first set of authentication credentials associated with the first dataset in response to the first request for authentication, wherein the first set of authentication credentials is valid for a first time period;

transmit the first set of authentication credentials to a first set of processes, wherein the first set of processes comprises at least two processes, wherein each of the first set of processes use the first set of authentication credentials to access data in the first dataset to process during the first time period;

receive an indication that a first process of the first set of processes has completed access to the first dataset within the first time period, wherein the first process is removed from the first set of processes before transmission of a second set of authentication credentials;

transmit a second request for authentication for the first authentication server, wherein the second request for authentication is associated with the first dataset, wherein the second request for authentication is transmitted within the first time period in which the first set of authentication credentials is valid;

receive the second set of authentication credentials associated with the first dataset in response to the second request for authentication, wherein the second set of authentication credentials is valid for a second time period; and transmit the second set of authentication credentials to the first set of processes, wherein each of the first set of processes use the second set of authentication credentials to access data in the first dataset to process during the second time period.

14. The computer program product of claim 13, wherein the at least one executable portion, upon execution by the at least one processing device, is further configured to receive the first dataset from a data source, wherein the first dataset is accessible using an active set of authentication credentials, wherein the active set of authentication credentials is first set of authentication credentials during the first time period and the active set of authentication credentials is second set of authentication credentials during the second time period.

15. The computer program product of claim 13, wherein the first set of authentication credentials is deactivated at an expiration of the first time period, wherein the second set of authentication credentials is distributed to the first set of processes before the expiration of the first time period.

16. The computer program product of claim 13, wherein each of first set of processes performs precipitation processing on a subset of the first dataset, wherein each of the first set of processes is assigned a distinct subset of the first dataset to process, wherein the precipitation processing is a same processing operation across each of the first set of processes.

17. The computer program product of claim 13, wherein the second request for authentication for the first authentication server is transmitted at a predetermined amount of time before an expiration of the first time period.

\* \* \* \* \*